United States Patent

Yutani et al.

[11] Patent Number: 5,439,980
[45] Date of Patent: Aug. 8, 1995

[54] PROCESS FOR PREPARING POLYMER

[75] Inventors: Yuji Yutani; Masayoshi Tatemoto, both of Osaka, Japan

[73] Assignee: Daikin Industries, Osaka, Japan

[21] Appl. No.: 169,753

[22] Filed: Dec. 20, 1993

Related U.S. Application Data

[63] Continuation-in-part of Ser. No. 32,541, Mar. 17, 1993, abandoned, which is a continuation of Ser. No. 798,759, Nov. 27, 1991, abandoned.

[30] Foreign Application Priority Data

Nov. 29, 1990 [JP] Japan ................... 2-335861

[51] Int. Cl.$^6$ .................................................. C08F 259/08
[52] U.S. Cl. ............................. 525/276; 525/267; 525/412; 525/344; 525/346; 525/359.3; 525/359.5; 526/206; 526/209
[58] Field of Search ............... 526/206, 201; 525/276, 525/267, 412

[56] References Cited

U.S. PATENT DOCUMENTS

| | | | |
|---|---|---|---|
| 3,983,187 | 9/1976 | Moczygemba et al. | 525/245 |
| 4,158,678 | 6/1979 | Tatemoto et al. | 522/141 |
| 4,861,836 | 8/1989 | Tatemoto et al. | 525/276 |
| 4,948,853 | 8/1990 | Longothetis | 526/247 |
| 5,037,921 | 8/1991 | Carlson | 526/247 |
| 5,047,622 | 9/1991 | Abe | 525/267 |
| 5,077,359 | 12/1991 | Moore | 526/206 |

FOREIGN PATENT DOCUMENTS 584728  1/1983  Japan .

*Primary Examiner*—Mark Nagumo
*Attorney, Agent, or Firm*—Birch, Stewart, Kolasch & Birch

[57] ABSTRACT

A polymer comprising at least one polymer chain is produced by polymerizing, in the presence of a radical generating source and an iodide compound, at least one monomer $M_1$ having a radically polymerizable unsaturated bond between a carbon atom and an iodine atom constituting a carbon-iodine bond of the iodide compound to form at least one polymer chain between the carbon atom and the iodine atom, wherein the polymerization reaction is carried out in the presence of a monomer $M_2$ which is different from the monomer $M_1$ and has a larger addition reactivity with a carbon radical which is generated by cleavage of the carbon-iodine bond of the iodide compound than that of the monomer $M_1$.

10 Claims, 9 Drawing Sheets

PROCESS FOR PREPARING POLYMER

This application is a continuation-in-part of application Ser. No. 08/032,541 filed on Mar. 17, 1993, now abandoned, which is a continuation application under 37 C.F.R. §1.62 of Ser. No. 07/798,759 filed on Nov. 27, 1991, now abandoned.

BACKGROUND OF THE INVENTION

1. Field of the Invention

The present invention relates to a novel process for preparing a polymer comprising at least one polymer chain.

In particular, the present invention relates to a polymerization process that is apparently a living polymerization process and has a reaction mechanism that is inherently characteristic of a radical polymerization process, and further to an improved process for preparing a block polymer.

More concretely, the present invention relates to a process for preparing a polymer that can be used to improve adhesion of a hydrocarbon polymer to a fluorine-containing polymer surface; an agent to improve compatability in a polymer alloy comprising a hydrocarbon polymer and a fluorine-containing polymer; a dispersant for a fluorine-containing paint; a carrier for electrophotography; an electrostatic charge adjusting agent or fusion bonding prevention agent for toner particles; and in the case where the hydrocarbon polymer chain is hydrophilic, as a fluorine-containing surfactant, an emulsifier or a dispersant of fluorocarbon based artificial blood.

2. Description of the Related Art

Japanese Patent Publication No. 4728/1983 and U.S. Pat. No. 4,158,678 disclose a process for synthesizing a block polymer by cleaving a carbon-iodine bond of an iodide compound to form a carbon radical and successively polymerizing radically polymerizable monomers.

In the above process, since a single hydrocarbon monomer is polymerized when a hydrocarbon monomer is intended to be polymerized with a fluorine-containing iodide polymer, it is not possible to polymerize the hydrocarbon monomer effectively.

Further, since a terminal carbon-iodine bond in the formed polymer is unstable, in some applications, it is necessary to replace the terminal iodine with other elements that form a stable bond. Hitherto, in a reaction to stabilize the terminal iodine, a large amount of a peroxide is required.

SUMMARY OP THE INVENTION

An object of the present invention is to provide a process for preparing a polymer, which can solve the above problems of the conventional process.

Another object of the present invention is to provide a process for preparing a polymer, wherein the above monomers are polymerized at a high efficiency, namely at a high iodine bonding rate.

One aspect of the present invention is directed to the improvement of the polymerization process disclosed in Japanese Patent Publication No. 4728/1983.

According to the present invention, there is provided a process for preparing a polymer which comprises polymerizing at least one monomer $M_1$ having a radically polymerizable unsaturated bond, in the presence of a radical generating source and an iodide compound having a carbon atom and an iodine atom constituting a carbon-iodine bond of said iodide compound, to form at least one polymer chain between said carbon atom and said iodine atom, wherein the polymerization reaction is carried out in the presence of a monomer $M_2$, which is different from said monomer $M_1$, and has a larger addition reactivity with the carbon radical that is generated by cleavage of said carbon-iodine bond of said iodine compound than that of said monomer $M_1$.

DETAILED DESCRIPTION OF THE INVENTION

Figure 1:
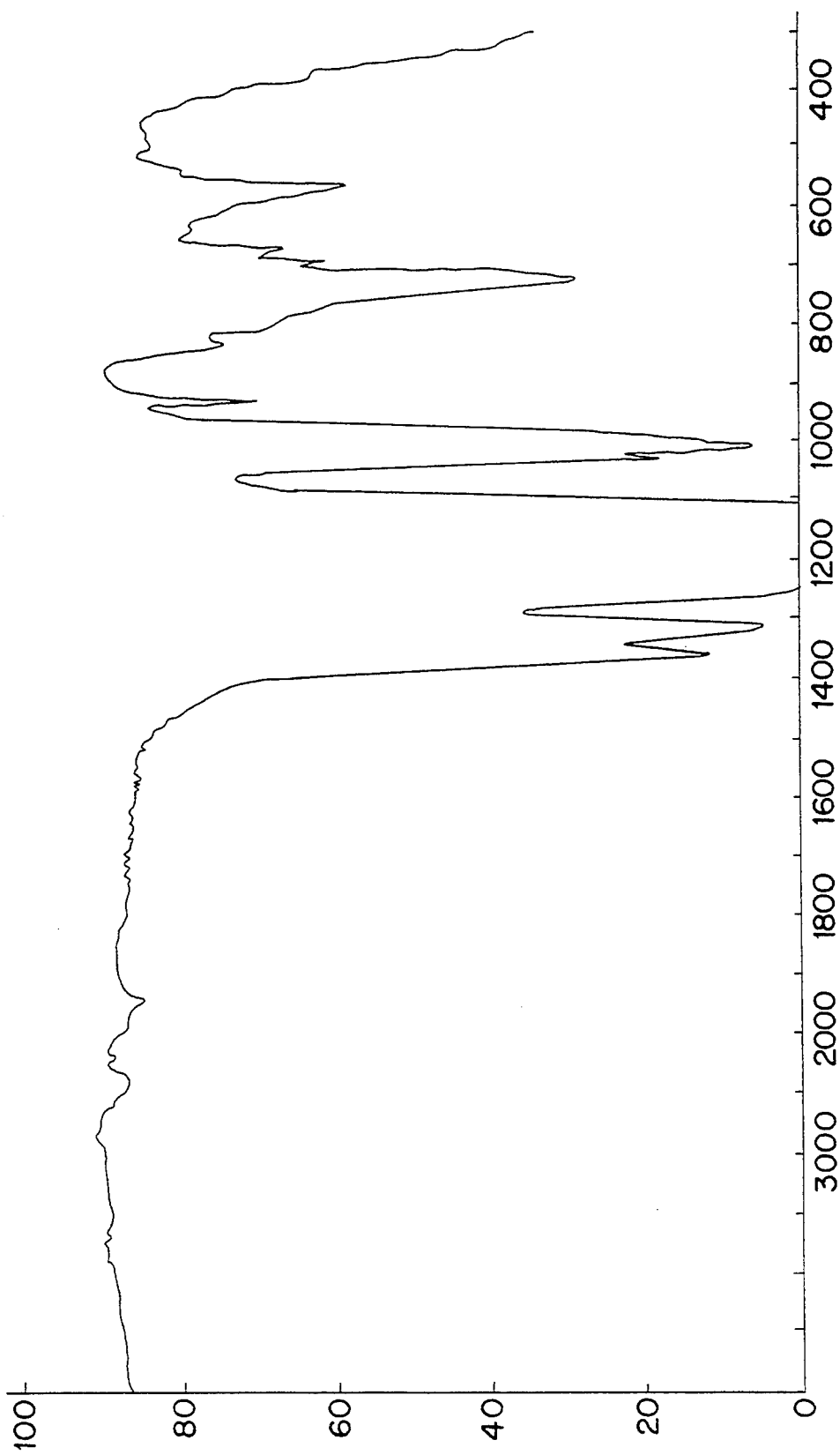
FIG. 1 is an IR spectrum of a polymer prepared in Comparative Example 1.

In the case where a monomer such as a hydrocarbon vinyl monomer is polymerized with a carbon radical that is generated through cleavage of the terminal carbon-iodine bond of the iodide compound, if the vinyl monomer has a low reactivity with the carbon radical, it is difficult to proceed the addition reaction of the vinyl monomer. In other words, a polymer that is bonded to an iodide residue (a residue formed by removing the iodine atom from the iodide compound) is hardly formed, even though the radical is generated from the iodide compound in the presence of the vinyl monomer.

In contrast, when an unsaturated compound having a high reactivity with the carbon radical of the iodide compound is used, that is, when an unsaturated compound $M_2$ such as ethylene or other α-olefin which, can be alternately copolymerized with a fluorine-containing vinyl monomer $M_1$, such as tetrafluoroethylene or chlorotrifluoroethylene (namely, $r_1 \approx r_2 \approx 0$), is used, the monomer $M_2$ is easily added to the carbon radical of the iodide compound.

Since most commonly used radically polymerizable monomers such as methyl acrylate, methyl methacrylate and acrylonitrile have very low reactivities with the carbon radical of the iodide compound, a homopolymer of each monomer is produced, but it is difficult to polymerize the monomer with the carbon radical of the iodide compound.

When, in the presence of the carbon radical of the iodide compound, an unsaturated compound (a monomer $M_2$) having a high reactivity with such carbon radical is used in combination with the Radically polymerizable hydrocarbon vinyl monomer having a low reactivity with such carbon radical, the monomer $M_2$ bonds to the carbon radical and thereafter a hydrocarbon polymer chain comprising the hydrocarbon vinyl monomer and the unsaturated compound monomer $M_2$ is formed by radical polymerization to give a polymer comprising the hydrocarbon polymer chain.

In this case, it is essential that the hydrocarbon monomer $M_1$ is copolymerized with the terminal radical of the unsaturated compound $M_2$, namely $1/r_2$ is not zero (0). In addition, in order that a larger amount of the intended hydrocarbon vinyl monomer is contained in the hydrocarbon polymer chain segment, preferably $r_1 \gg r_2 \approx 0$.

If, when the terminal carbon radical of the growing polymer withdraws an iodine atom from another iodide compound molecule, the withdrawal finishes at the chain end ($1/r_1$ is not zero and $1/r_2$ is not zero), namely, the polymer terminal is stopped through the withdrawal of the iodine atom to form a terminal of - - - $M_2$-I. If the terminal iodine atom of the - - - $M_2$-I type terminal is easily radically chain transferred, the hydrocarbon polymer chain grows in the same manner as a living polymerization.

The iodide compound used in the present invention is a compound to which at least one iodine atom is bonded, that is stable to such a degree that it cannot lose effectiveness through a side reaction under the polymerization conditions and that is not cleaned at any bond other than the bond comprising the iodine atom. The iodide compound may contain a fluorine atom. Further, the iodide compound may comprise an element other than carbon, iodine and hydrogen, such as chlorine. In addition, the iodide compound may contain a functional group such as —O—, —S—, $R_fN$—, wherein $R_f$ is a polyfluoroalkyl group, —COOH, $SO_3H$, $PO_3OH$, etc.

In general, the iodide compound includes not only a low molecular weight compound but also a polymeric iodide compound having a molecular weight of 2,000,000 or less that is prepared by polymerization or copolymerization of an unsaturated compound having an iodine atom; coupling of a polyiodinated fluorohydrocarbon; iodination of a polymer having a reactive atom or atom group; polymerization in a system in which a chain transfer reaction to a polymer takes place easily in the presence of iodine $I_2$; or polymerization of a monomer that constitutes a polymer chain in the presence of iodine or a compound that can liberate an iodine atom such as KI or ROI wherein R is an alkyl group.

Specific examples of the polymeric iodide compounds are fluorine-containing iodides, for example, iodine-containing homopolymer or copolymer prepared by the polymerization describe above of tetrafluoroethylene, trifluoroethylene, vinylidene fluoride, vinyl fluoride, chlorotrifluoroethylene, hexafluoropropylene, pentafluoropropylene, perfluorocyclobutene, perfluoro(methylenecyclopropane), perfluoroallene, perfluorostyrene, perfluorovinyl ethers (such as perfluoromethyl vinyl ether), perfluoroacrylic acid, perfluorovinylacetate, perfluoro(3-vinyloxypropionic acid), perfluoro[2-(2-fluorosulfonylethoxy)propyl vinyl ether] and polyfluorodienes. Other examples are fluorine-containing copolymers of at least one of the above radically polymerizable fluorolefins with at least one hydrocarbon monomer that can form a suitable polymer chain by the copolymerization with these fluorolefins. Examples of such hydrocarbon monomer are ethylene, α-olefin (e.g. propylene, butene and the like), vinyl carboxylate ester (e.g. vinyl acetate and the like), vinyl ether (e.g. methyl vinyl ether and the like) and aryl carboxylate ester (e.g. aryl acetate and the like). In addition, further examples of the polymeric iodide compounds are iodine-containing compounds having a chain of the formula:

$$—(OCF_2)_p—(OCF_2CF_2)_q—[OCF_2CF(CF_3)]_r—$$

wherein p, q and r are independently 0 or a positive number, and at least one of them is not 0, or the formula:

$$—(CF_2CF_2CXYO)_n—$$

wherein n is a positive number, and X and Y are independently a fluorine atom or a hydrogen atom.

Of course, a polymer prepared according to the present invention may be used as the iodide compound. All polymeric iodide compounds prepared in the presence of an iodide compound according to the method of present invention are used as the hydrocarbon iodide compound. Specific examples are an ethylene/propylene rubber and polybutadiene in which iodine bonds to a molecular end. In addition, the following iodide compounds can be also used:

Polymeric iodides based on polyolefin, polyether, polyester, polyamide, polyurethane or silicone, for example, I—(CH$_2$CHPh)$_n$—I (wherein Ph is a phenyl group),
ICH$_2$—(CH$_2$CHOAc)$_n$—(CH$_2$CH$_2$)$_m$—I (wherein Ac is an acetate group)

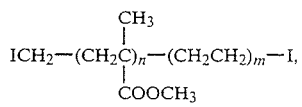

$$ICH_2—(CH_2\underset{\underset{COOCH_3}{|}}{\overset{\overset{CH_3}{|}}{C}})_n—(CH_2CH_2)_m—I,$$

$$R—(CH_2\underset{\underset{}{}}{\overset{\overset{R'}{|}}{C}}HO)_n—CH_2CH_2—I,$$

R—(O—R''—CO)$_n$—CH$_2$CH$_2$—I
R—(Ph'—O)$_n$—CH$_2$CH$_2$—I (wherein Ph' is a phenylene group),
R—(CO—R''—NH)$_n$—CH$_2$CH$_2$—I, and $$R—(\underset{\underset{CH_3}{|}}{\overset{\overset{R'}{|}}{Si}}—O)_n—(\underset{\underset{CH_3}{|}}{\overset{\overset{CH_2CH_2I}{|}}{Si}}—O)_m—H.$$

Specific examples of a low molecular weight iodide compound are fluorine-containing compounds such as monoiodoperfluoromethane, monoiodoperfluoroethane, monoiodoperfluoropropane, monoiodoperfluorobutane (e.g. 2-iodoperflorobutane, 1-iodoperfluoro(1,1-dimethylethane) and the like), monoiodoperfluoropentane (e.g. 1-iodoperfluoro(4-methylbutane) and the like), 1-iodoperfluoro-n-nonane, monoiodoperfluorocyclobutane, 2-iodoperfluoro(1-cyclobutyl)ethane, monoiodoperfluorocyclohexane, monoiodotrifluorocyclobutane, monoiododifluoromethane, monoiodomonofluoromethane, 2-iodo-1-hydroperfluoroethane, 3-iodo-1-hydroperfluoropropane, monoiodomonochlorodifluoromethane, monoiododichloromonofluoromethane, 2-iodo-1,2-dichloro-1,1,2-trifluoroethane, 4-iodo-1,2-dichloroperfluorobutane, 6-iodo-1,2-dichloroperfluorohexane, 4-iodo-1,2,4-trichloroperfluorobutane, 1-iodo-2,2-dihydroperfluoropropane, 1-iodo-2-hydroperfluoropropane, monoiodotrifluoroethane, 3-iodoperfluoroprop-1-ene, 4-iodoperfluoropentene-1,4-iodo-5-chloroperfluoropent-1-ene, 2-iodoperfluoro(1-cyclobutenyl)ethane, 1,3-diiodoperfluoro-n-propane, 1,4-diiodoperfluoro-n-butane, 1,3-diiodo-2-chloroperfluoro-n-propane, 1,5-diiodo-2,4-dichloroperfluoro-n-pentane, 1,7-diiodoperfluoro-n-octane, 1-iodoperfluorodecane, 1,12-diiodoperfluorododecane, 1,16-diiodoperfluorohexadecane, 1,2-di(iododifluoromethyl)perfluorocyclobutane, 2-iodo-1,1,1-trifluoroethane, 1-iodo-1-hydroperfluoro(2-methylethane), 2-iodo-2,2-dichloro-1,1,1-trifluoroethane, 2-iodo-2-chloro-1,1,1-trifluoroethane, 2-iodoperfluoroethyl perfluorovinyl ether, 2-iodoperfluoroethyl perfluoroisopropyl ether, 3-iodo-2-chloroperfluorobutyl perfluoromethyl ether, 3-iodo-4-chloroperfluorobutyric acid, iodopentafluorocyclohexane, 1,4-diiodotetrafluorocyclohexane and 1,4-di(iododifluoromethyl)tetrafluorocyclohexane. Further specific examples are hydrocarbon iodide compounds such as $CH_3I$, $CH_2I_2$, $CHI_3$, $ICH_2CH_2I$, $CH_2=CHCH_2-CH_2I$, iodobenzene, 1,4-diiodobenzene, 1,4-di(iodomethyl)benzene. The iodide compound is not limited to the above compounds.

Specific examples of the monomer $M_1$ are acrylic unsaturated compounds, for example, acrylic acid, methacrylic acid, methyl acrylate, ethyl acrylate, butyl acrylate, methyl methacrylate, ethyl methacrylate, butyl methacrylate, glycidyl methacrylate, glycidyl acrylate, 2-hydroxyethyl acrylate, 2-ethylhexyl acrylate, potassium methacrylate, cyclohexyl methacrylate, 2-(dimethylamino)ethyl methacrylate, stearyl methacrylate, 2-hydroxyethyl methacrylate, 2-hydroxypropyl methacrylate, vinyl methacrylate, benzyl methacrylate, lauryl methacrylate, acrylamide, acrolein, methacrylamide, methacrolein, acrylonitrile, methacrylonitrile, styrene, methylstyrene, chlorostyrene, vinyl acetate, vinyl propionate, vinyl butyrate, vinyl valerate, vinyl chloride, vinyltrichlorosilane, vinyltrimethoxysilane, vinyltrimethylsilane, butadiene, isoprene, chloroprene, maleic acid, maleimide, methyl maleate, ethyl maleate, propyl maleate, butyl maleate, calcium maleate, allyl maleate, 2-ethylhexyl maleate, octyl maleate, maleic hydrazide, meleic anhydride, fumaric acid, methyl fumarate, ethyl fumarate, propyl fumarate, butyl fumarate, sodium fumarate, fumaronitrile and fumaryl chloride.

Specific examples of a fluorine-containing monomer $M_1$ are tetrafluoroethylene, trifluoroethylene, vinylidene fluoride, vinyl fluoride, chlorotrifluoroethylene, hexafluoropropylene, pentafluoropropylene, perfluorocyclobutene, perfluoro(methylenecyclopropane), perfluoroallene, trifluorostyrene, perfluorostyrene, perfluorovinyl ethers [e.g. perfluoro(methyl vinyl ether), perfluoro(ethyl vinyl ether), perfluoro(propyl vinyl ether) and the like], perfluoroacrylic acid, perfluorovinylacetic acid, perfluoro(3-vinyloxypropionic acid), perfluoro[2-(2-fluorosulfonylethoxy)propyl vinyl ether], α-fluoroacrylic acid, methyl α-fluoroacrylate, ethyl α-fluoroacrylate, phenyl α-fluoroacrylate, 3,3,4,4,4-pentafluorobut-1-ene, 3,3,3-trifluoropropene, 3,3,4,4,5,5,5-heptafluoropent-1-ene, polyfluorodienes and the like.

Specific examples of the monomer $M_2$ are ethylene, other α-olefins (e.g. propylene, butene, isobutene, pentene, hexene, heptene, octene and the like), vinyl ethers (e.g. methyl vinyl ether, ethyl vinyl ether, propyl vinyl ether and the like), allyl esters (e.g. allyl acetate, allyl propionate, allyl butyrate and the like), and vinylsilanes (e.g. vinyltrimethylsilane, vinyltriethylsilane, vinyltriphenylsilane, vinyltrichlorosilane and the like). Among them the α-olefins are preferred.

These examples do not limit the scope of the present invention. Insofar as the monomers satisfy the conditions set forth by the present invention, the vinyl monomer that is exemplified as monomer $M_1$ may be used as monomer $M_2$, or the vinyl monomer that is exemplified as monomer $M_2$ may be used as monomer $M_1$.

According to the process of the present invention, it is possible to produce not only a polymer consisting of one polymer chain but also a block polymer consisting of at least two different polymer chains. Herein, the term "different polymer chains" is intended to mean that all the constituent monomers are different between two polymer chains and also that a ratio of two or more monomers or a bonding sequence thereof are different between the two polymer chains though the kinds of the monomers are the same.

In particular, the present invention is directed to a process for preparing a polymer which comprises polymerizing at least one monomer $M_1$, having a radically polymerizable unsaturated bond, in the presence of a monomer $M_2$, which is different from monomer $M_1$, a radical generating source and an iodide compound having a cleavable carbon-iodine bond and capable of producing a carbon radical and an iodine atom upon cleavage, to form at least one polymer chain between the carbon radical and iodine atom, wherein monomer $M_2$ has a larger addition reactivity with the carbon radical than monomer $M_1$, and a copolymerization reaction rate $r_2$ of less than 2 or zero, wherein monomer $M_1$ has a copolymerization reaction rate $r_1$ greater than 1 and less than 100, and preferably greater than 5 and less than 30.

In the present invention, the Iodide Bonding Ratio (IBR) is calculated as a ratio of the polymer that is formed by the addition of the vinyl monomer to the cleaved carbon-iodine bond of the iodide compound according to the following equation:

$$IBR (\%) = \frac{\text{The number of the carbon-iodine bonds which are cleaved and contribute to the polymerization}}{\text{The number of the carbon-iodine bonds of the iodide compound molecules}} \times 100$$

Since a peak in an IR spectrum based on the terminal iodide bond of a polymer that is produced by using $F(CF_2CF_2CF_2O)_n-CF_2CF_2I$ appears around 920 $cm^{-1}$, IBR after the polymerization reaction can be calculated according to the following equation:

$$\frac{\text{(An absorbance peak height at 925 } cm^{-1} \text{ before reaction)} - \text{(an absorbance peak height at 925 } cm^{-1} \text{ after reaction)}}{\text{(An absorbance peak height at 925 } cm^{-1} \text{ before reaction)}} \times 100$$

Further, in the $^{19}F$-NMR, since a chemical shift based on $-OCF_2CF_2I$ appears around $-12.5$ ppm, IBR can be calculated from this chemical shift. It is understood from the results in the Examples that the calculated IBR values are substantially the same as the actual IBR values.

When the $M_2$ monomer is not used, the IBR is greatly influenced by a kind of the $M_1$ monomer and, in general, is considerably low. The decrease in the IBR cannot be sufficiently recovered even if the polymerization temperature and/or the monomer concentration are selected to favor the chain transfer reaction of the iodide compound. In other words, a high reaction temperature and a low monomer concentration, conditions that are favorable to the chain transfer reaction of the iodide compound, would not cause an increase in the IBR when the $M_2$ monomer is not used. When the monomer $M_2$ is used in combination with the monomer $M_1$, the addition of only several moles of the monomer $M_2$ increases the IBR by 50% or more depending on the monomer $M_2$. The IBR can increase up to about 100% as the concentration of the monomer $M_2$ increases. This is one of the most significant effects of the present invention.

The polymer prepared according to the present invention has a molecular weight of 4,000,000 or less, and in general, from 1000 to 4,000,000.

If the carbon-iodide bond which is easily cleaved by heat or light remains at the terminal portion of the prepared polymer, the iodine atoms are easily liberated, so that some disadvantages tend to appear, for example, the polymer is deteriorated or colored, or a material which is contacted with the polymer is corroded. To prevent such disadvantages, it is preferable to replace the terminal iodine with another element that forms a stable bond with the carbon atom. In such a replacing reaction, the terminal carbon-iodine bond of the polymer is cleaved with heat, light or a radical initiator in the presence of a compound containing an element that is easily radical chain transferred (e.g. isopentane, toluene, carbon tetrachloride, etc.) to form the terminal carbon radical. Then, the terminal carbon radical withdraws a hydrogen atom or a chlorine atom from the compound containing an element that is easily radical chain transferred to form a terminal carbon-hydrogen or carbon-chlorine bond. In such a treatment, a compound that can capture the liberated iodine (e.g. sodium sulfite, etc.) is preferably used.

PREFERRED EMBODIMENT OF THE INVENTION

The present invention will be illustrated by the following Examples and Comparative Examples. The following Examples are not intended to limit the present invention.

COMPARATIVE EXAMPLE 1

In a pressure autoclave, $F(CF_2CF_2CF_2O)_nCF_2CF_2I$ (average n: 27.4, average molecular weight=about 4,800) (5.0 g) and methyl acrylate (MA) (5.0 g) were dissolved in 1,1,2-trichloro-1,2,2-trifluoroethane (R-113) (30 cc). Then, azobisisobutyronitrile (AIBN) ($6.4 \times 10^{-3}$ g) was added. After cooling, the atmosphere was fully replaced with a nitrogen gas. Then, the atmosphere was pressurized to 1.0 kg/cm$^2$G with the nitrogen gas. The mixture was heated to 70° C. with stirring and polymerized for 5 hours. After completion of the polymerization, the autoclave was opened. The content was vacuum distilled at 40° C. to remove the solvent and the residual monomer. The yield was measured to be 9.7 g. The resultant polymer had two separated parts which were a transparent oil part and a white resin part.

An IR spectrum of the oil part was measured. As shown in FIG. 1, only peaks based on perfluoropolyether were observed and no peak based on poly-MA (polymethyl acrylate) was observed. A peak at 920 cm$^{-1}$ based on a terminal —CF$_2$—I group remained at the same intensity as before the reaction. In addition, an IR spectrum of the white resin part was measured. Only peaks based on poly-MA were observed. From this, it is clear that when only MA is used, only a homopolymer of MA is produced and a block polymer with a perfluoropolyether chain is not produced.

EXAMPLE 1

In a pressure autoclave, $F(CF_2CF_2CF_2O)_nCF_2CF_2I$ (average n: 27.4, average molecular weight: about 4,800) (20.0 g) and MA (20.0 g) were dissolved in R-113 (120 cc). Then, AIBN ($1.69 \times 10^{-2}$ g) was added. The atmosphere was fully replaced first with a nitrogen gas, and then with an ethylene gas. Then, the atmosphere was pressurized with the ethylene gas to 14.8 kg/cm$^2$G at 70° C. The mixture was polymerized at 70° C. for 5 hours. Then, AIBN ($1.6 \times 10^{-2}$ g) and MA (20.0 g) were added and the polymerization was continued for 9 hours. After the completion of the polymerization, the autoclave was opened. Although a small part of resultant poly-MA adhered to a wall of the autoclave, a large part of poly-MA was dispersed in R-113. After the content was vacuum dried at 40° C., the yield of the product was measured to be 56.2 g. No separation between an oil part and a resin part was observed.

Figure 2:
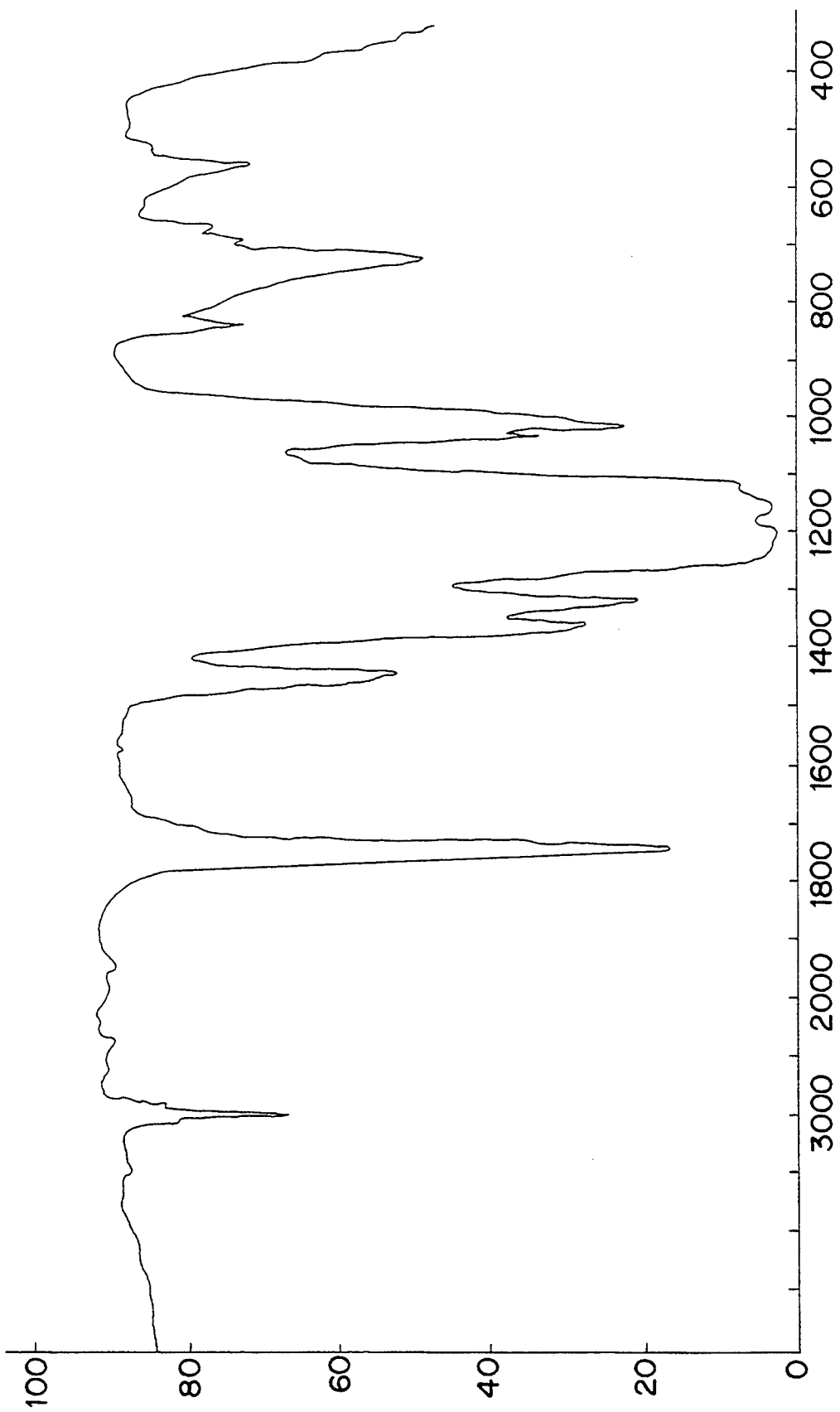
FIG. 2 is an IR spectrum of a polymer prepared in Example 1.

The resultant polymer was dispersed and dissolved again in R-113 and filtered through a glass filter. A filtrate was vacuum dried at 40° C. to obtain a greasy polymer. An IR spectrum of this polymer was measured. As shown in FIG. 2, in addition to peaks based on the perfluoropolyether, peaks based on a copolymer of MA and ethylene were observed at 2,800 cm$^{-1}$, 1,730 cm$^{-1}$, 1,440 cm$^{-1}$ and the like. The peak at 920 cm$^{-1}$ comple was 100%.

From the result, it is apparent that a MA-ethylene random copolymer chain forms a covalent bond with a perfluoropolyether chain and accordingly the polymer was dissolved in R-113 and contained in the filtrate.

EXAMPLE 2

In a pressure autoclave, n—C$_8$H$_{17}$I (1.3 g) and MA (15.0 g) were dissolved in R-113 (100 cc). Then, AIBN ($9.3 \times 10^{-3}$ g) was added. The atmosphere was fully replaced first with a nitrogen gas, and then with an ethylene gas. Then, the atmosphere was pressurized with the ethylene gas to 30.0 kg/cm$^2$G at 70° C. The mixture was polymerized at 70° C. for 8 hours. Then, the autoclave was opened. After the content was vacuum dried at 40° C., the yield of the product was measured to be 4.9 g.

R-113 was added to the resultant polymer, and then a R-113-soluble part and a R-113-insoluble part were formed. $^1$H-NMR and $^{19}$F-NMR spectra of each of two parts were measured. In $^{19}$F-NMR spectrum, both of the soluble and insoluble parts had a peak at about 36 ppm (an external standard of trichloroacetic acid) based on —CF$_2$—CH$_2$—, which indicates a covalent bond of a fluorocarbon chain with a hydrocarbon chain. In addition, the composition of the hydrocarbon chain segment and a molecular weight as a whole were determined. The result is shown in Table 1. It is apparent from Table 1 that almost all the hydrocarbon chain consists of MA units.

A peak based on

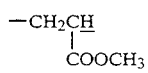

was not observed, although a peak based on —CH$_2$CH$_2$I was observed at about 3.0 ppm in $^1$H-NMR spectra of both parts. From this, it is apparent that all ends of the hydrocarbon chain segments are terminated with ethylene units (—CH$_2$CH$_2$I). The R-113-soluble part has a higher ethylene content than in the insoluble part, since ethylene is introduced in a larger content in the fluorocarbon chain unite and the terminal part of the molecule.

TABLE 1

|  | Ethylene unit (% by mole) | MA unit (% by mole) | Molecular weight |
| --- | --- | --- | --- |
| R-113-soluble part | 22 | 78 | 1,160 |
| R-113-insoluble part | 13 | 87 | 2,030 |

COMPARATIVE EXAMPLE 2

In a pressure autoclave, F(CF$_2$CF$_2$CF$_2$O)$_n$CF$_2$CF$_2$I (average molecular weight: about 4,800) (7.1 g) and methyl methacrylate (MMA) (7.1 g) were dissolved in perfluorobenzene (20 cc). Then, AIBN (2.02×10$^{-2}$ g) was added. The atmosphere was fully replaced with a nitrogen gas and then pressurized to about 1 kg/cm$^2$G with the nitrogen gas. The mixture was heated to 80° C. with stirring and then polymerized for 5 hours, After the completion of the polymerization, the autoclave was opened and the content was vacuum dried at 40° C. The yield was measured to be 12.1 g. The resultant polymer had two separated parts which were a transparent oil part and a white resin part.

An IR spectrum of each of the oil and resin parts was measured. Only peaks based on the perfluoropolyether were observed in the oil part and only peaks based on poly-MMA were observed in the resin part. The transparent oil part had a peak at 920 cm$^{-1}$ which had the same intensity as before the polymerization, It was found that when MMA alone is used, only a homopolymer of MMA is produced and a block polymer with a perfluoropolyether chain is not produced.

EXAMPLE 3

In a pressure autoclave, F(CF$_2$CF$_2$CF$_2$O)$_n$CF$_2$CF$_2$I (average molecular weight: about 4,800) (15.0 g) and MMA (15.0 g) were dissolved in R113 (90 cc). Then, AIBN (9.6×10$^{-3}$ g) was added. The atmosphere was fully replaced first with a nitrogen gas, and then with an ethylene gas. Then, the atmosphere was pressurized with the ethylene gas to 32.0 kg/cm$^2$G at 70° C. The mixture was polymerized at 70° C. MMA (totally 45.2 g) and AIBN (totally 2.91×10$^{-2}$ g) were added depending on their consumption during polymerization. After polymerization for 45 hours, the autoclave was opened. Although a small part of a product adhered to the wall of the autoclave, the resultant poly-MMA was dispersed in R-113. After the content was vacuum dried at 40° C., the yield of the product was measured to be 80.3 g. No separation of an oil part from a resin part was observed.

Figure 3:
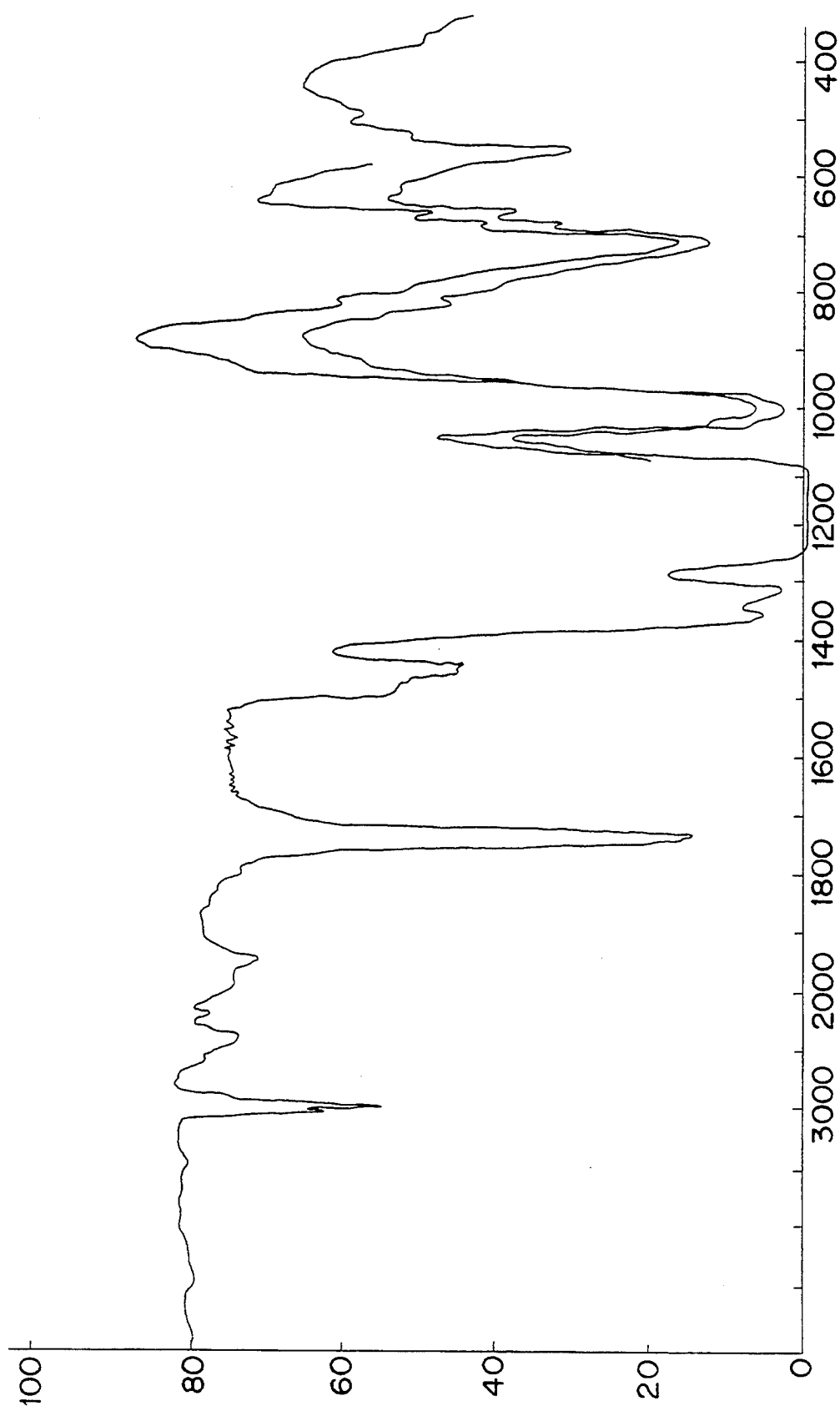
FIG. 3 is an IR spectrum of a polymer prepared in Example 3.

The resultant polymer was dispersed and dissolved again in R-113 and filtered through a glass filter. A filtrate was vacuum dried at 40° C. to obtain a greasy polymer. An IR spectrum of this polymer was measured. As shown in FIG. 3, in addition to peaks based on the perfluoropolyether, peaks based on a copolymer of MMA and ethylene were observed at 2,800 cm$^{-1}$, 1,730 cm$^{-1}$, 1,480 cm$^{-1}$, 1,440 cm$^{-1}$ and the like. The peak at 920 cm$^{-1}$ completely disappeared. Accordingly, the block ratio (IBR) was 100%.

From the result, it is apparent that a MMA-ethylene random copolymer chain forms a covalent bond with a perfluoropolyether chain and, accordingly, the polymer is dissolved in R-113 and contained in the filtrate.

EXAMPLE 4

Into a pressure autoclave, an iodine-double-terminated rubber dispersion based on vinylidene fluoride (VdF)/hexafluoropropylene (HPP)/tetrafluoroethylene (TFE) (molar ratio: 55/19/26) (average molecular weight: 18,000) (300 g) (solid content: 6% by weight) was charged. Then, MMA (0.7 g), ammonium perfluorooctanoate salt (1.5 g) and (CH$_3$)$_3$CCOOH (5.96 g×10$^{-2}$) were added. The atmosphere was fully replaced first with nitrogen and then with ethylene. The atmosphere was pressurized with ethylene to 27.0 kg/cm$^2$G at 140° C. Then, the polymerization was continued for 30 hours at 140° C. while MMA (totally 44.8 g), fully bubbled with a nitrogen gas, was continuously added. After the completion of the polymerization, the product was coagulated with potash alum and subjected to GPC. It was found that the rubbery polymer before polymerization had a number average molecular weight of 18,000 and a molecular weight distribution of 1.29, and the resinous polymer after polymerization had a number average molecular weight of 28,000 and a molecular weight distribution of 1.28. This shows that the molecular weight distribution is constant and only the molecular weight increases. It is apparent that the MMA and ethylene monomers additionally polymerize with a terminal carbon radical that is formed by cleavage of a carbon-iodine bond at an end of the fluorine-containing polymer chain, and that the cleavage and the monomer addition occur again, even though the polymer end was terminated with an iodine atom, that is, the polymerization proceeds livingly according to a living polymerization process.

EXAMPLE 5

In a pressure autoclave, F(CF$_2$CF$_2$CF$_2$O)$_n$CF$_2$CF$_2$I (average molecular weight: about 4,800) (5.0 g), MA (2.0 g) and 1-hexene (4.6 g) were dissolved in R-113 (30 cc). Then, AIBN (9.7×10$^{-3}$ g) was added. The atmosphere was fully replaced with a nitrogen gas and then pressurized with the nitrogen gas to about 1 kg/cm$^2$G, After heating to 70° C., the mixture was polymerized for 7.9 hours. After the completion of the polymerization, the content was vacuum dried at 40° C. A yield of the product was measured to be 5.9 g.

Figure 4:
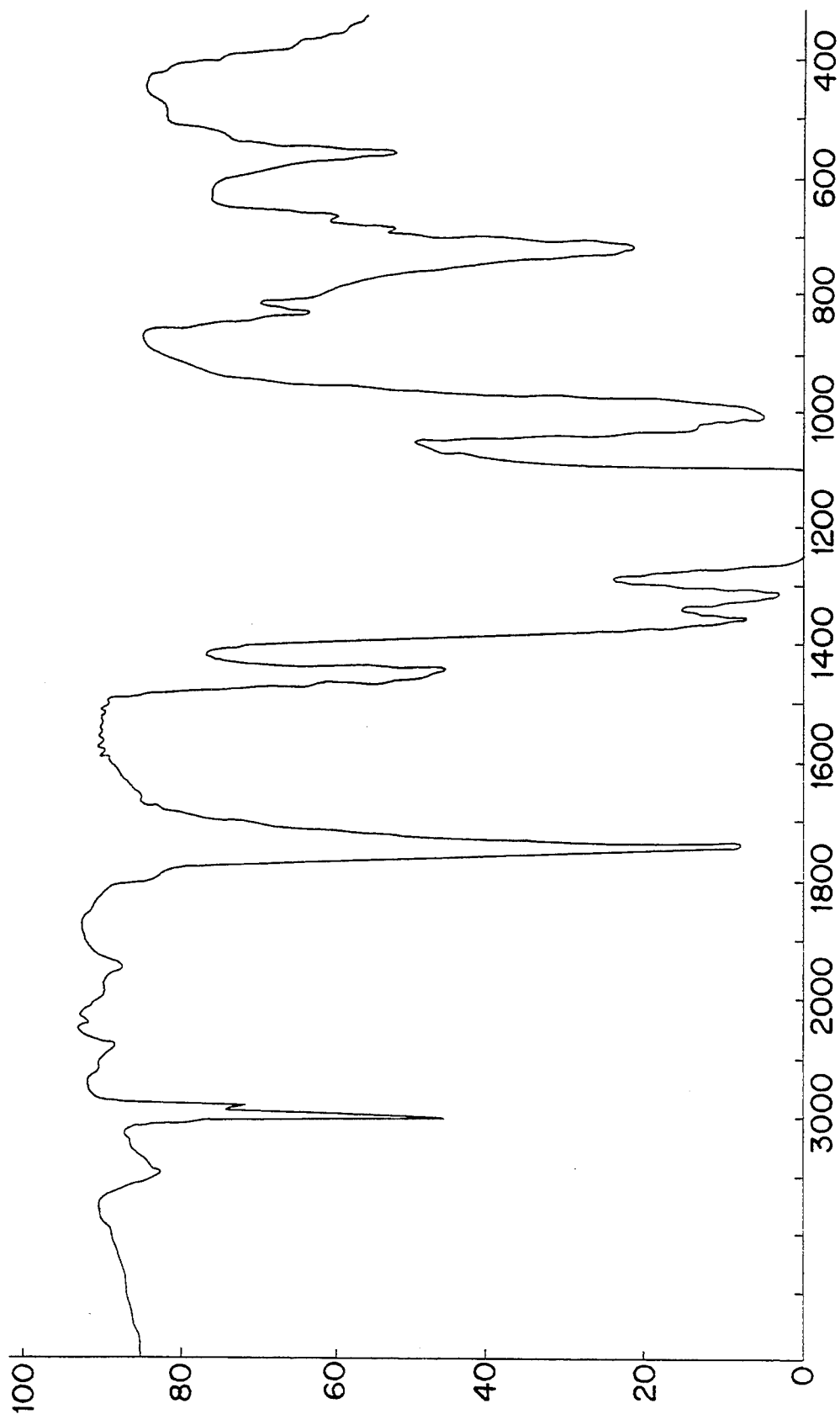
FIG. 4 is an IR spectrum of a polymer prepared in Example 5.

Although the resultant polymer was brownish because of the liberation of the terminal iodine atom, it was a greasy polymer having high transparency. An IR spectrum of the polymer was measured. As shown in FIG. 4, both of peaks based on the perfluoropolyether chain and peaks based on the hydrocarbon polymer chain (a random polymer chain of MA and 1-hexene) were observed. The peak at 920 cm$^{-1}$ based on —CF$_2$—I completely disappeared. Namely, IBR was 100%.

In addition, an NMR spectrum of this polymer was measured. In the $^{19}$F-NMR spectrum, the polymer had a peak at about 40 ppm (an external standard of trichloroacetic acid) based on —CF$_2$—CF$_2$—, which confirmed a covalent bond of a fluorocarbon chain with a hydrocarbon chain. The $^1$H-NMR spectrum showed that a ratio of the MA units to the 1-hexene units in the hydrocarbon chain is 62:38 (molar ratio), wherein the MA units are contained in larger amount than the 1-hexene units. A peak based on —CH$_2$CH(COOCH$_3$)—I at about 4.4 ppm and a peak based on —CH$_2$CH(C$_4$H$_9$)—I at about 3.2 ppm were observed.

The above result shows that the polymerization gives a block polymer which has a perfluoropolyether chain and a copolymer chain consisting of MA and 1-hexene with a large amount of MA.

An experiment confirmed that a ratio of MA to 1-hexene in the polymer can be controlled by controlling the addition amount of 1-hexene.

EXAMPLE 6

In a pressure autoclave, an iodine-double-terminated liquid rubber based on VdF/HFP/TFE (molar ratio: 52/21/27) (25.0 g), MA (24.4 g) and 1-hexene (25.0 g) were dissolved in R-113 (150 cc). Then, AIBN (6.42×10$^{-2}$ g) was added. The atmosphere was fully replaced with a nitrogen gas and then pressurized with the nitrogen gas to about 1 kg/cm$^2$G. The mixture was heated to 70° C. The polymerization was conducted while the monomers and the initiator [MA (totally 42.2 g), 1-hexene (totally 26.8 g) and AIBN (totally 0.14 g)] were added during polymerization. After the completion of the polymerization, the autoclave opened. The polymer was dissolved in the solvent to form a homogeneous transparent solution before the polymerization, but after polymerization, an opaque liquid was formed. The content was vacuum dried at 40° C. to give a resinous polymer having a high transparency. GPC analysis was conducted on this resultant polymer and also on a polymer which was sampled after 8 hours from the initiation of the polymerization. The result is shown in Table 2. This shows that, although the molecular weight after the polymerization was at least twice that before the polymerization, the molecular weight distribution was almost the same. It is confirmed that a carbon-iodine bond is cleaved at an end of the fluorine-containing polymer chain, and the polymerization proceeds according to a living polymerization process and that a block polymer consisting of a fluorine-containing polymer chain and a hydrocarbon polymer chain is produced.

TABLE 2

|  | M$_n$ | M$_w$ | M$_w$/M$_n$ |
| --- | --- | --- | --- |
| Before reaction | 4,200 | 5,200 | 1.23 |
| After 8 hour reaction | 6,500 | 8,200 | 1.25 |
| After 16 hour reaction | 8,500 | 11,300 | 1.32 |

EXAMPLE 7

In a pressure autoclave, F(CF$_2$CF$_2$CF$_2$O)$_n$CF$_2$CF$_2$I (average of n: 20, average molecular weight: about 3,700) (40.0 g), acrylic acid (AA) (22.5 g) and 1-hexene (26.3 g) were dissolved in R-113 (240 cc). Then, AIBN (7.59×10$^{-2}$ g) was added. The atmosphere was fully replaced with a nitrogen gas and then pressurized with the nitrogen gas to about 1 kg/cm$^2$G. After heating to 70° C. with stirring, the mixture was polymerized for 8.0 hours. After the completion of the polymerization, the autoclave was opened. The content was vacuum dried at 40° C. A yield of the product was measured to be 54.56 g.

Figure 5:
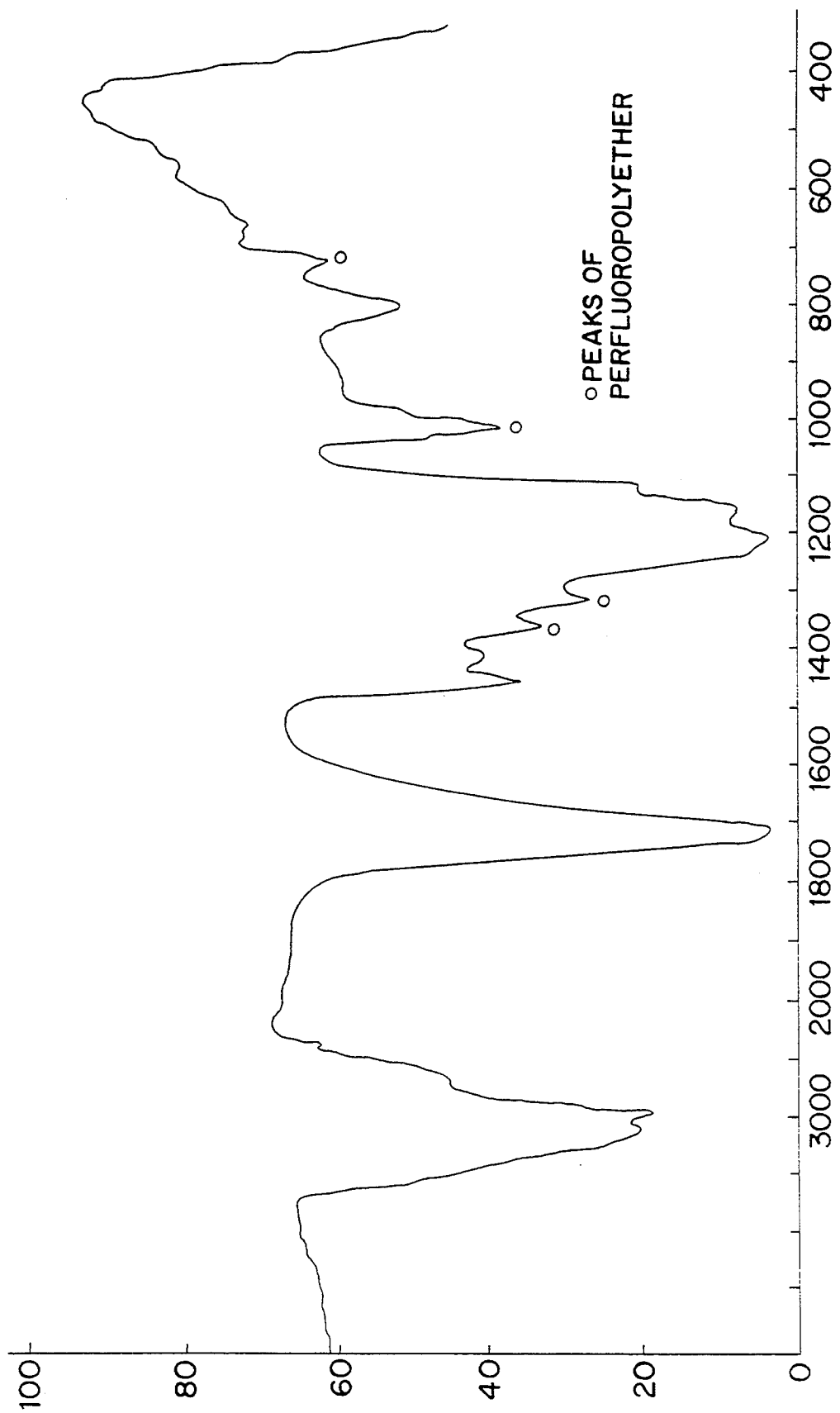
FIGS. 5 and 6 are IR spectra of two polymers prepared in Example 7.

An IR spectrum of the polymer was measured. As shown in FIG. 5, peaks based on a copolymer of AA and 1-hexene were also observed at 3,100 cm$^{-1}$, 1,710 cm$^{-1}$, 1,450 cm$^{-1}$ and the like, in addition to peaks based on the perfluoropolyether chain. The peak at 920 cm$^{-1}$ completely disappeared.

When the resultant polymer was extracted with R-113, an insoluble part was a powdery polymer. This powdery polymer (2.0 g) was dispersed in water (100 cc) and NaOH was added to adjust a pH value to 7. The whole system had an increased viscosity and the opaque state turned to a transparent state.

Figure 6:
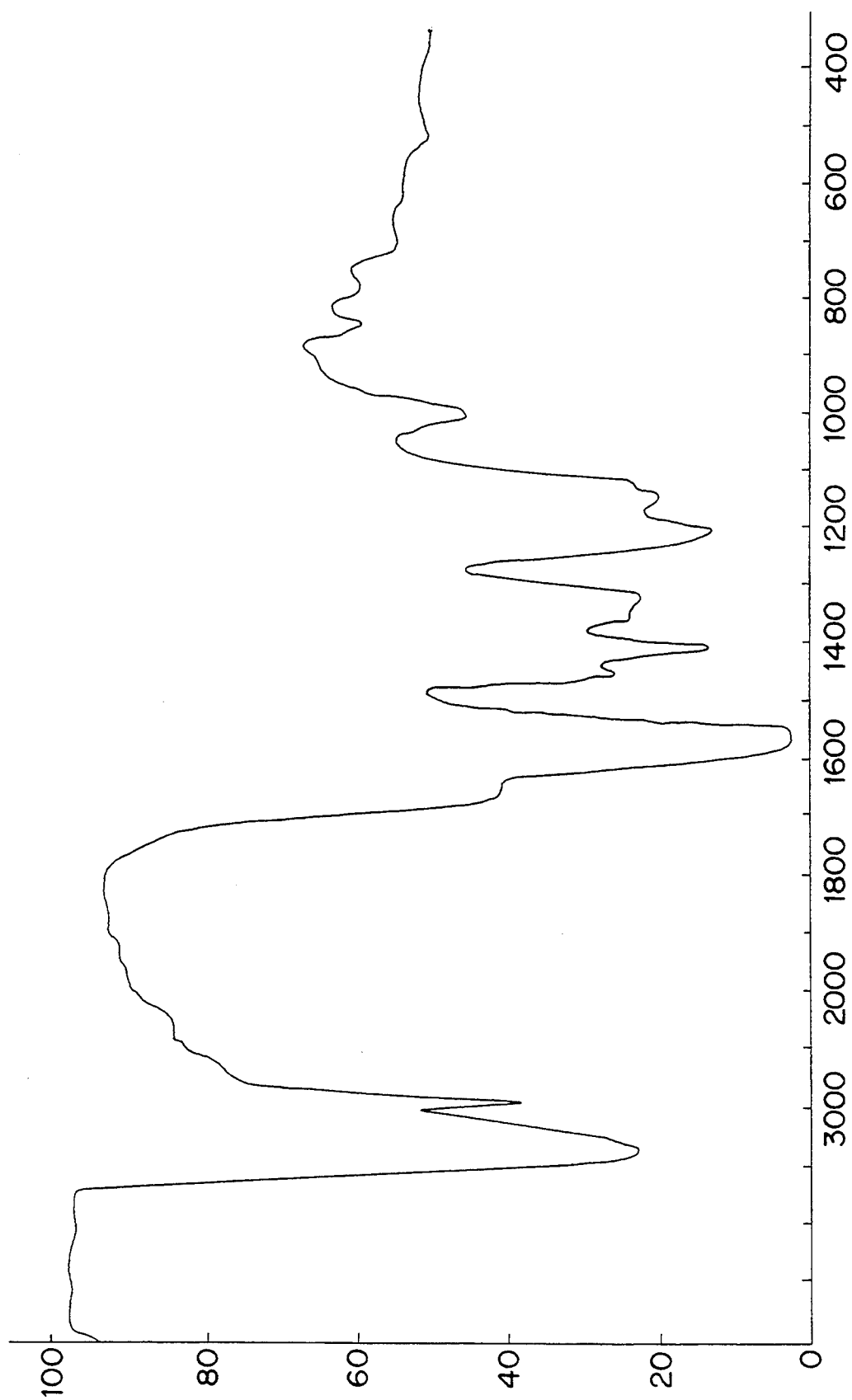
Figure 7:
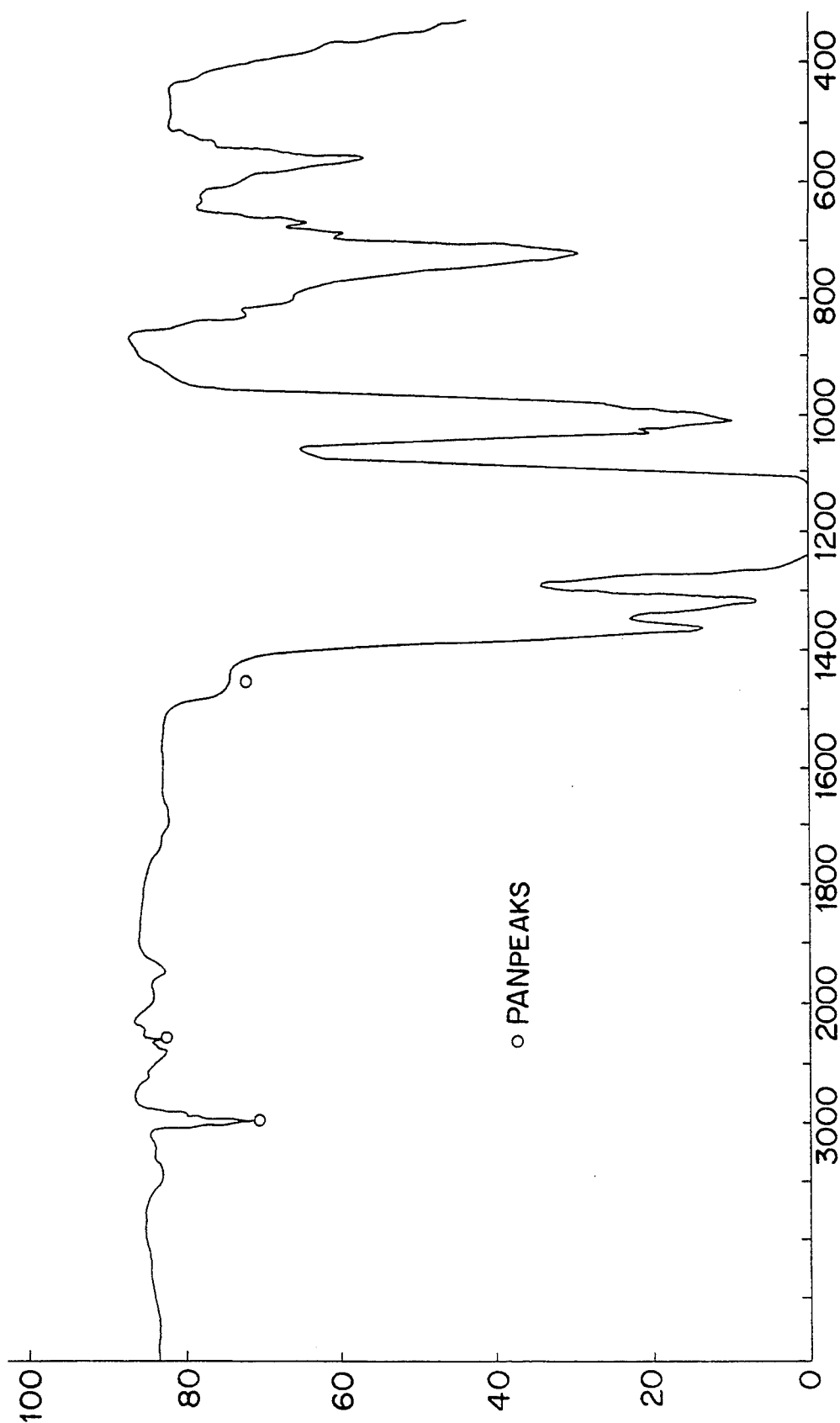
FIG. 7 is an IR spectrum of a polymer prepared in Example 8.

This polymer was dried and its IR spectrum was measured. As shown in FIG. 6, peaks based on a copolymer of sodium acrylate (AANa) and 1-hexene were observed at 3,350 cm$^{-1}$, 2,900 cm$^{-1}$, 1,560 cm$^{-1}$ and the like, in addition to peaks based on the perfluoropolyether chain. No peak at 920 cm$^{-1}$ was observed. In addition, an NMR spectrum of this polymer was measured. In the $^{19}$F-NMR spectrum, a peak based on —CF$_2$—CH$_2$— was observed at 39 ppm. The $^1$H-NMR spectrum showed that a ratio of AANa units to 1-hexene units in the hydrocarbon chain segment is 75:24 (molar ratio), wherein the AANa is contained in larger amount than 1-hexene. The above result shows that the polymerization gives a water-soluble fluorine-containing block polymer which has a perfluoropolyether chain and a hydrocarbon polymer chain consisting of AANa units and 1-hexene units.

An experiment confirmed that a ratio of AA to 1-hexene in the polymer can be controlled by controlling the addition amount of 1-hexene.

IBR in this Example was determined as follows.

Since, in the IR spectrum, a peak at 1,100 cm$^{-1}$ (probably based on an ether linkage of the perfluoropolyether) is constant before and after the polymerization, this peak is considered as a standard.

Before the reaction, the iodine-terminated perfluoropolyether has an absorbance at 1,100 cm$^{-1}$ of 1.434 [=ln(75.5/18)] and an absorbance at 920 cm$^{-1}$ of 0.158 [=ln(82/70)].

After the reaction, the absorbance at 1,100 cm$^{-1}$ in the IR spectrum is 1.609 [=ln(77.5/15.5)] and the absorbance at 920 cm$^{-1}$ is 0.065 [=ln(79.5/74.5)].

Accordingly, the ratio of unreacted terminal carbon-iodine bonds after the reaction is calculated as follows:

$$\frac{\text{Number of carbon-iodine bonds after the reaction}}{\text{Number of carbon-iodine bonds before the reaction}} =$$

$$\frac{\text{Intensity of peak at 920 cm}^{-1}\text{ after the reaction}}{\text{Intensity of peak at 920 cm}^{-1}\text{ before the reaction}} =$$

$$\frac{\text{Absorbance of peak at 920 cm}^{-1}\text{ after the reaction}}{\text{Absorbance of peak at 1,100 cm}^{-1}\text{ after the reaction}} \div$$

$$\frac{\text{Absorbance of peak at 920 cm}^{-1}\text{ before the reaction}}{\text{Absorbance of peak at 1,100 cm}^{-1}\text{ before the reaction}} =$$

$$\frac{|\ln(79.5/74.5)|}{|\ln(77.5/15.5)|} \div \frac{|\ln(82/70)|}{|\ln(75.5/18)|} = \frac{|0.065|}{|1.609|} \div$$

$$\frac{|0.158|}{|1.434|} = 0.37$$

The peak at 920 cm$^{-1}$ decreased after reaction, namely the ratio of the carbon-iodine bonds that connect with the hydrocarbon chain segment by the reaction, or namely IBR, is calculated to be (1−0.37)×100=63%.

COMPARATIVE EXAMPLE 3

In a pressure Pyrex autoclave, F(CF$_2$CF$_2$CF$_2$O)$_n$—CF$_2$CF$_2$I (average molecular weight: about 4,800)

(5.0 g) and acrylonitrile (AN) (4.2 g) were dissolved in R-113 (30 cc). Then, a solution of sodium sulfite (0.10 g) in water (5 cc) was added. The atmosphere was fully replaced with a nitrogen gas and then pressurized to about 1 kg/cm$^2$G with the nitrogen gas. The mixture was polymerized at 70° C. for 8 hours while irradiating with UV light. After completion of the polymerization, the autoclave was opened. The content was removed and vacuum dried at 40° C. The yield was measured to be 9.1 g. However, an oil part was separated from the resultant resinous polymer.

An IR spectrum of the separated oil part was measured. Only peaks based on a perfluoropolyether chain were observed peaks based on poly-AN chain were hardly observed. The peak at 920 cm$^{-1}$ after polymerization had almost the same intensity as before polymerization.

An IR spectrum of the resinous part was measured. Only peaks based on the poly-AN were observed, but peaks based on the perfluoropolyether chain were not observed. The result shows that when AN alone is used, only a homopolymer of AN is produced and a block polymer with the perfluoropolyether chain is not produced.

EXAMPLE 8

In a pressure quartz autoclave, F(CF$_2$CF$_2$CF$_2$O)$_n$—CF$_2$CF$_2$I (average molecular weights: 4,800) (3.0 g) AN (1.3 g) and 1-hexene (4.6 g) were dissolved in R-113 (30 cc), Then, a solution of sodium sulfite (0.1 g) in water (5 cc) was added. The atmosphere was fully replaced with a nitrogen gas and then pressurized with the nitrogen gas to about 1 kg/cm$^2$G. The mixture was polymerized at 70° C. for 8.0 hours while irradiating with UV light in which light having a wave length of not longer than 240 nm was cut by a filter, After the completion of the polymerization, the content was vacuum dried at 40° C. to obtain a slightly opaque and oily polymer. The yield of the product was measured to be 5.4 g.

An IR spectrum of the resultant polymer was measured. Peaks based on a hydrocarbon random polymer consisting of the AN and 1-hexene units were observed at 2,900 cm$^{-1}$, 2,250 cm$^{-1}$, 1,440 cm$^{-1}$ and the like, in addition to peaks based on the perfluoropolyether chain. The peak at 920 cm$^{-1}$ completely disappeared. In addition, an NMR spectrum of the polymer was measured. In the $^{19}$F-NMR spectrum, a peak based on —CF$_2$—CH$_2$— was observed at about 38 ppm (an external standard of trichloroacetic acid). The $^1$H-NMR spectrum showed that a ratio of AN units to 1-hexene units in the hydrocarbon chain is 39:61 (molar ratio).

It was confirmed that the polymerization gives a block polymer which has a perfluoropolyether chain and a hydrocarbon polymer chain consisting of AN units and 1-hexene units.

An experiment confirmed that a ratio of AN to 1-hexene in the polymer can be controlled by controlling the addition amount of 1-hexene.

EXAMPLE 9

In a pressure Pyrex autoclave, the block copolymer having a terminal iodide bond prepared in Example 5 (2.5 g) and isopentane (3.0 g) were dissolved in R-113 (15 cc). Then, a solution of sodium sulfite (0.1 g) in water (5 cc) was added. The atmosphere was fully replaced with a nitrogen gas and then pressurized with the nitrogen gas to about 1 kg/cm$^2$G. The polymer terminal was stabilized at 70° C. for 8.0 hours while irradiating with UV light. After the completion of the stabilization, the content was washed with water. Then, the solution in R-113 was vacuum dried at 40° C. The resultant polymer was greasy and highly transparent. An elemental analysis was conducted. The polymer had an iodine content of not more than 0.01% by weight and iodine could be removed from the polymer by this reaction. Even when the polymer was subjected to sunlight in the air, the color of the polymer did not change to brown. The reaction gave a block polymer having a terminal stabilized by hydrogen.

EXAMPLE 10

Each of the R-113-soluble parts prepared in Examples 1 and 3 (namely, a block polymer having a perfluoropolyether chain and a hydrocarbon polymer chain which contains a large amount of MA units, and a block polymer having a perfluoropolyether chain and a hydrocarbon polymer chain which contains a large amount of MMA units) in different ratios was added to an about 4% solution of poly-MMA (molecular weight: about 600,000) in acetone.

Figure 8:
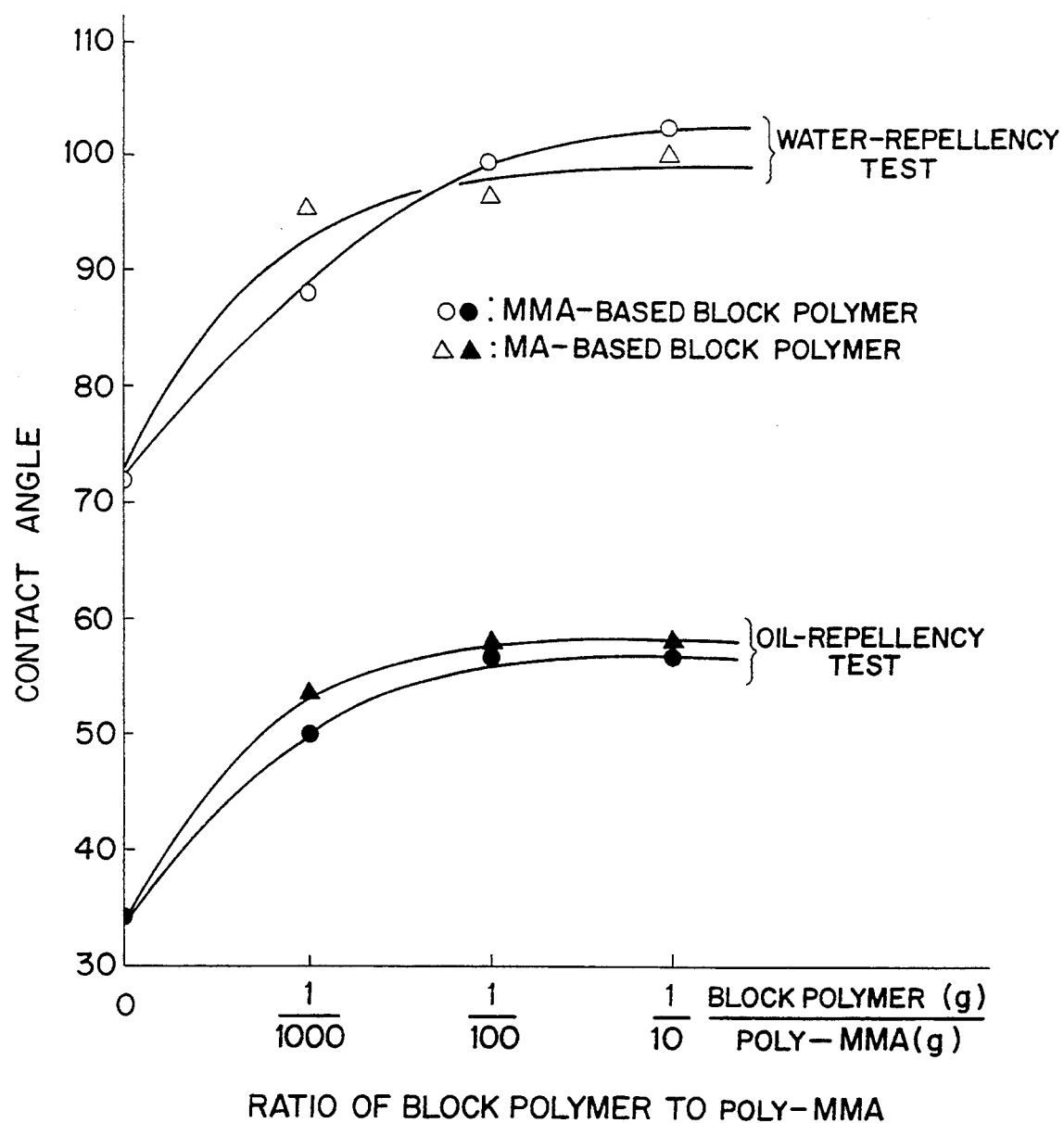
FIG. 8 is a graph showing a contact angle measured in Example 10.

After poly-MMA and block poly-MMA were homogeneously dispersed and dissolved in acetone, a solution was cast on a glass plate and acetone was evaporated to obtain a homogeneous, highly transparent and smooth film. An oil or water droplet was dropped on this film to measure a contact angle. The result is shown in FIG. 8.

This result shows that when ratios of both MA-based and MMA-based block polymers to poly-MMA are increased, the contact angle increases, but when the ratios reach certain values, the contact angle does not further increase. This may be because the block polymer gives good water- and oil-repellency to the film since the hydrocarbon polymer chain of the block polymer enters into the poly-MMA phase due to its compatibility with poly-MMA, and the perfluoropolyether chain, which is the other component of the block polymer, appears on a surface part of the film (anchor effect).

In the same manner as described above for the block polymer, the perfluoropolyether (molecular weight: about 4500) was mixed with poly-MMA in an acetone solvent and cast on a glass plate. The perfluoropolyether floated on the poly-MMA and a homogeneous film containing a fluoropolymer chain could not be obtained.

EXAMPLE 11

Figure 9:
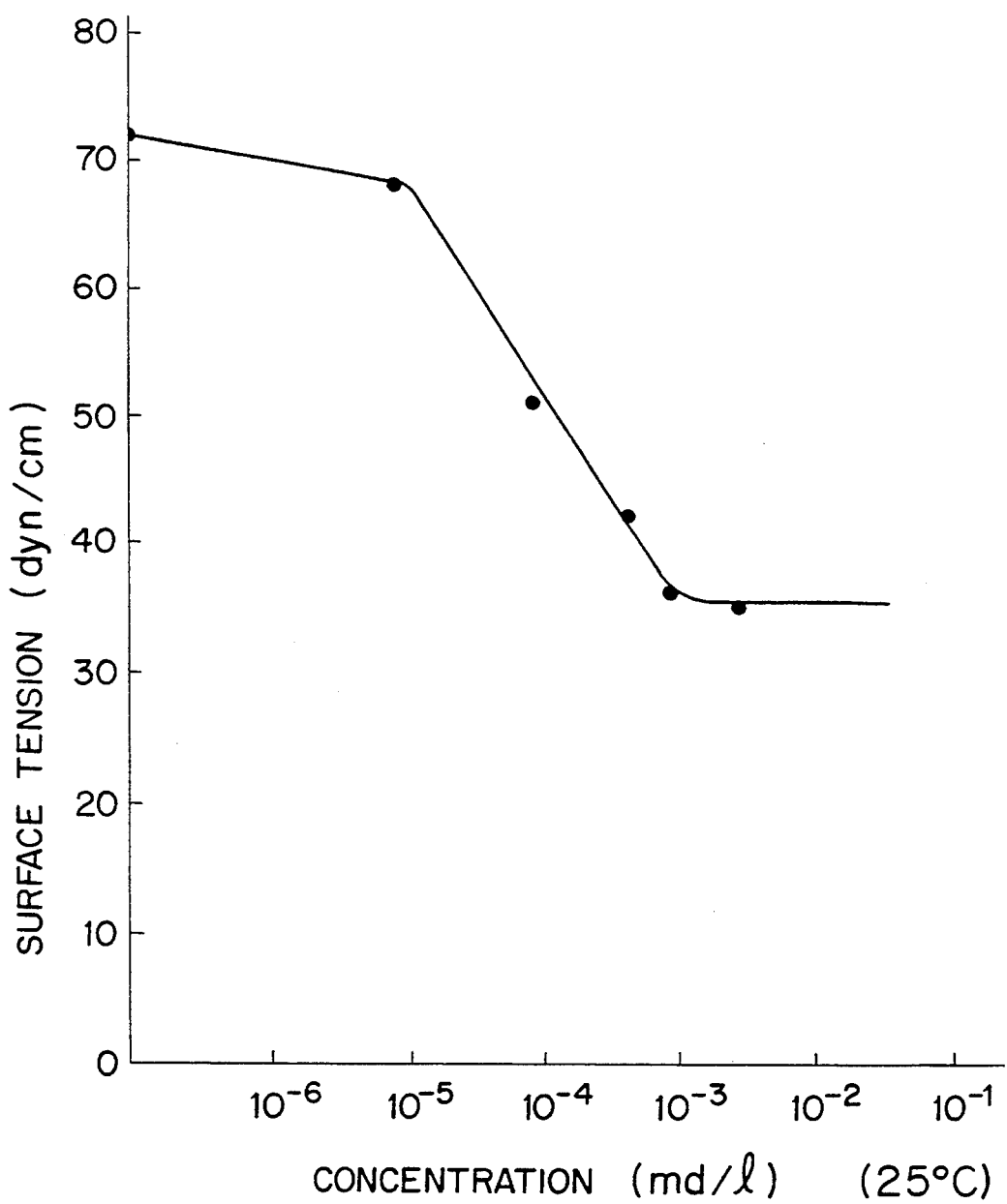
FIG. 9 is a graph showing a surface tension of water measured in Example 11.

The block polymer prepared in Example 7 and having a pefluoropolyether chain and a hydrocarbon polymer chain which contains a large amount of acrylic acid units was added in various ratios to water to measure a surface tension of an aqueous solution. The result is shown in FIG. 9.

The result shows that when the content of the block polymer in the aqueous solution is increased, the surface tension decreases to 35 dyn/cm. FIG. 9 shows that a critical micelle concentration is about $1 \times 10^{-3}$ mol/l.

Prom this, it is confirmed that the block polymer consisting of the flexible fluoropolymer chain and the water-soluble hydrocarbon polymer chain effectively decreases the surface tension of water.

What is claimed is:

1. A process for preparing a polymer which comprises polymerizing at least one monomer $M_1$, having a radically polymerizable unsaturated bond, in the presence of a monomer $M_2$, which is different from said monomer $M_1$, a radical generating source and an iodide compound having a cleavable carbon-iodine bond and capable of producing a carbon radical and an iodine atom upon cleavage, to form at least one polymer chain between said carbon radical and said iodine atom, wherein said monomer $M_2$ has a larger addition reactivity with said carbon radical than said monomer $M_1$, and a copolymerization reaction rate $r_2$ of zero, wherein said monomer $M_1$ has a copolymerization reaction rate $r_1$ greater than 1 and less than 100, and wherein said iodine atom of said iodide compound may be withdrawn by a radical of said $M_2$ monomer to form a terminal iodide bond between said $M_2$ monomer radical and said iodine atom, said iodine atom of said terminal iodide bond having substantially the same transfer activity as said iodine atom when bonded to said iodide compound.

2. The process according to claim 1, wherein the copolymerization reaction ratio $r_1$, of monomer $M_1$ is larger than the reaction ratio $r_2$ of monomer $M_2$, and $r_1$ is greater than 5 and less than 30, and $r_2$ is zero.

3. The process according to claim 1, wherein said monomer $M_2$ is an $\alpha$-olefin.

4. The process according to claim 1, wherein said monomer $M_1$ is a radically polymerizable unsaturated hydrocarbon.

5. The process according to claim 1, wherein said monomer $M_1$ is an acrylic unsaturated compound.

6. The process according to claim 1, wherein said iodide compound is a fluorine-containing iodide compound.

7. The process according to claim 1, wherein said iodide compound is a low molecular weight perfluorinated alkyl iodide.

8. The process according to claim 1, wherein said iodide compound is an iodine-containing fluoropolymer.

9. The process according to claim 1, further comprising a step for converting a terminal carbon-iodine bond of the produced polymer to a carbon-hydrogen bond.

10. A process for preparing a polymer which comprises polymerizing at least one monomer $M_1$, having a radically polymerizable unsaturated bond, in the presence of a monomer $M_2$, which is different from said monomer $M_1$, a radical generating source and an iodide compound having a cleavable carbon-iodine bond and capable of producing a carbon radical and an iodine atom upon cleavage, to form at least one polymer chain between said carbon radical and said iodine atom, wherein said monomer $M_2$ has a larger addition reactivity with said carbon radical than said monomer $M_1$ and a copolymerization reaction rate $r_2$ of less than 2, and wherein said iodine atom of said iodide compound may be withdrawn by a radical of said $M_2$ monomer to form a terminal iodide bond between said $M_2$ monomer radical and said iodine atom, said iodine atom of said terminal iodide bond having substantially the same transfer activity as said iodine atom when bonded to said iodide compound.

* * * * *